Dec. 21, 1926.                                        1,611,383
              W. H. SCHOONMAKER
                 TRAVELER'S CHECK
                Filed Oct. 10, 1922
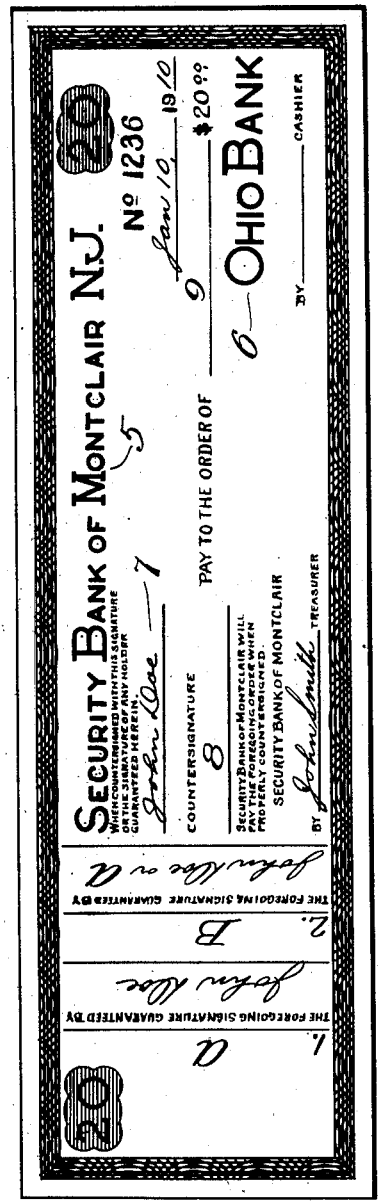

Patented Dec. 21, 1926.

1,611,383

UNITED STATES PATENT OFFICE.

WILLIAM H. SCHOONMAKER, OF MONTCLAIR, NEW JERSEY.

TRAVELER'S CHECK.

Application filed October 10, 1922. Serial No. 593,510.

This invention relates to bank checks of the general type used by travelers.

The invention has for a principal object to increase generally the security of this form of negotiable paper and to eliminate the possibility of the payment of funds to a holder not legitimately in possession of the instrument.

The invention includes a provision for the countersigning of a check of this character with the name of the original holder or with the name of a subsequent indorser whose signature has been guaranteed by a previous indorser. The result of this is that no holder of the check, subsequent to the original holder, can collect funds on the check save upon the guarantee of his signature expressed in the form of an indorsement thereof by the original holder or by a prior indorser whose signature has been in turn guaranteed. In addition to having his signature guaranteed, the indorser is required to countersign the check to completely validate the same before its conversion into funds. Thus the name of every holder of the check must appear twice, first as an indorser, and then either as a guarantor of the signature of a subsequent indorser or as a countersignature to verify and prove itself, so that a complete chain of verified or guaranteed indorsements between the original holder of the check and the actual payee is provided.

In the drawings, in which a preferred embodiment of the invention has been selected for illustration, the figure is a face view of a traveler's check embodying one form of the invention.

Referring to the drawing for a more detailed description of the invention the check carries the name at 5 of the main bank or other organization against which the order is drawn, the name of the issuing bank at 6, a space at 7 for the signature of the original depositor, a space at 8 for the counter-signature of the holder who converts the check into funds, and a space at 9 for the name of the payee. The arrangement described is generally the same as a form of travelers' check that has gone into extensive use except that in the heretofore known form the space at 8 was intended to receive only the countersignature of the original depositor while in the form herein described the space at 8 may receive the countersignature of the original depositor or of a subsequent holder of the check.

The older form of check while amply securing and facilitating the payment of funds to the original depositor because of the provision for the countersignature of the depositor, is lacking in a desirable or adequate degree of protection so far as the payment of funds to subsequent holders is concerned. The reason for this is that, while the actual existence of funds against which the check was drawn is assured, there is no satisfactory assurance that subsequent indorsers of the check are legitimately in possession thereof and entitled to receive funds thereon.

With a view to overcoming the referred-to defect in checks of the general type described I have devised a provision or arrangement whereby if the check is transferred by the original depositor to another holder, before the check can be further negotiated it must be indorsed by the new holder and the endorsement certified or guaranteed by the depositor. For example, if the check is transferred by the depositor John Doe whose signature was placed on the check at 7 when the check was issued, to the holder A, then the signature of A is indorsed by him on the line 1, preferably on the back of the check. The certifying or guaranteeing signature of John Doe is then placed below A's signature below the legend "The foregoing signature guaranteed by".

In like manner, a further transfer of the check by A to still another holder B is effected by the signature of B on the indorsement line 2, followed by the guaranteeing signature of either John Doe or of A just below. This means of negotiating or transferring the check from holder to holder without actually collecting funds thereon may be thus indefinitely extended by the indorsement of the name of the new holder with his signature certified by the original depositor or any prior indorser.

The forms and legends referred to suffice to validate the transfer of the check from holder to holder and to insure that no holder is in unauthorized possession thereof. In order to place the check in condition to obtain funds thereon it is necessary to countersign the check in the space 8 with the signature of the then holder of the check, this countersignature to be written in the presence of the bank or other institution where the conversion of the check into cash or funds is made. The countersignature will be that of the original depositor if the check has not passed out of his hands or of the last holder whose signature has been duly guaranteed by a previous holder and the countersignature is for the purpose of proving to the bank cashing the check that the holder presenting the check is actually the person whose guaranteed indorsement appears thereon.

It will be seen that I have provided a check of the general character described in which the security of negotiation is greatly increased and the danger of the payment of funds to a person wrongfully in possession of the instrument eliminated.

What I claim is:—

1. A form of traveler's check including an appropriately designated space for receiving the signature of the original depositor at the time of issue of the check, a second appropriately designated space for the indorsing signature of the second holder of the check, a third appropriately designated space for the signature of the original depositor, printed legendary matter reciting that the signature in the second-named space is guaranteed by the signature in the third-named space, and a fourth appropriately designated space accompanied by a printed legend requiring that the last holder countersign therein at the time of presenting for payment.

2. A check as described in claim 1 in which all of the signatures appear on the face of the instrument.

In testimony whereof I affix my signature.

WILLIAM H. SCHOONMAKER.